Jan. 7, 1936.  O. U. ZERK  2,027,138
UNIVERSAL JOINT
Filed April 12, 1932  3 Sheets-Sheet 1
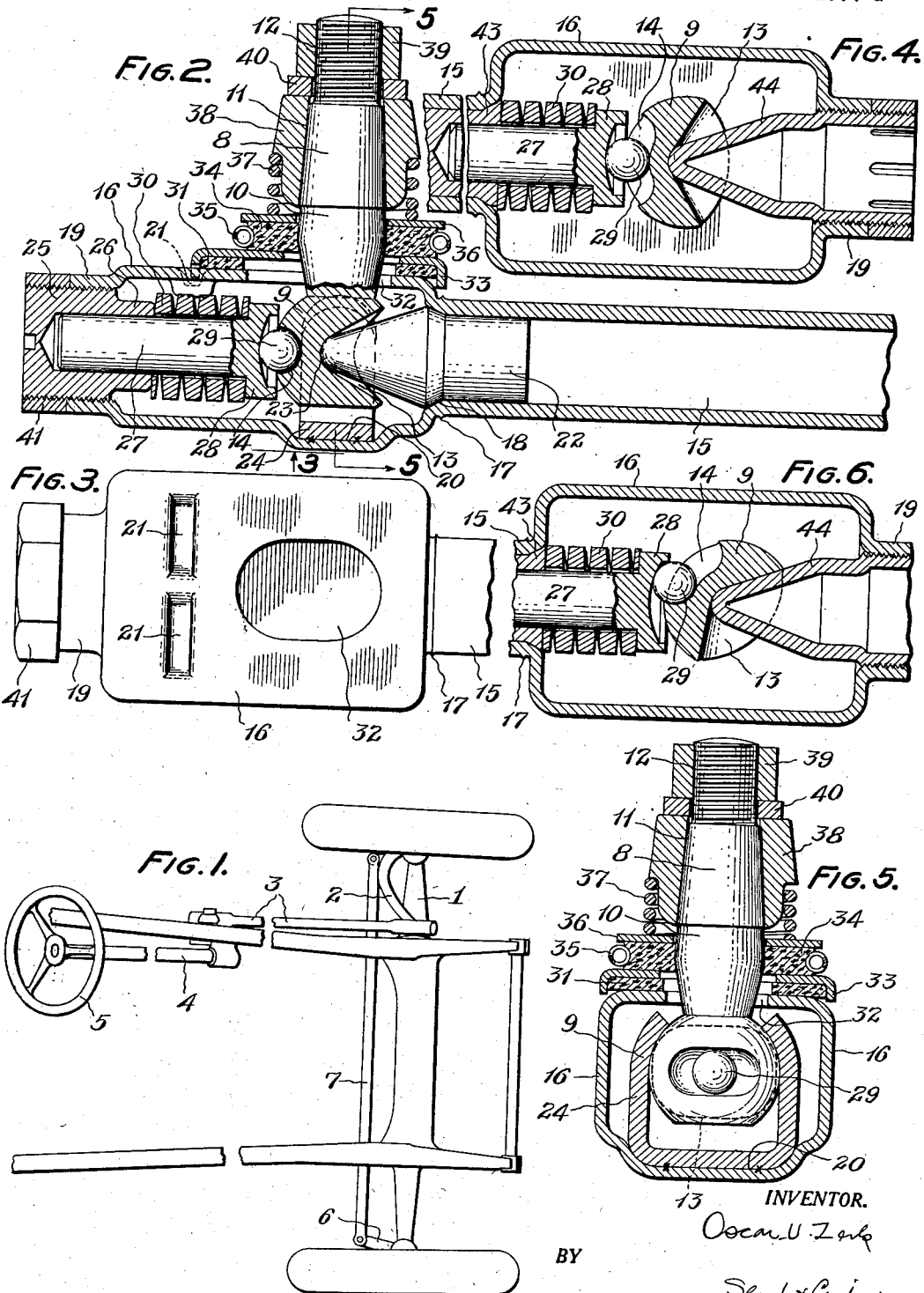
INVENTOR.
Oscar U. Zerk
BY
ATTORNEYS Jan. 7, 1936.  O. U. ZERK  2,027,138
UNIVERSAL JOINT
Filed April 12, 1932  3 Sheets-Sheet 2
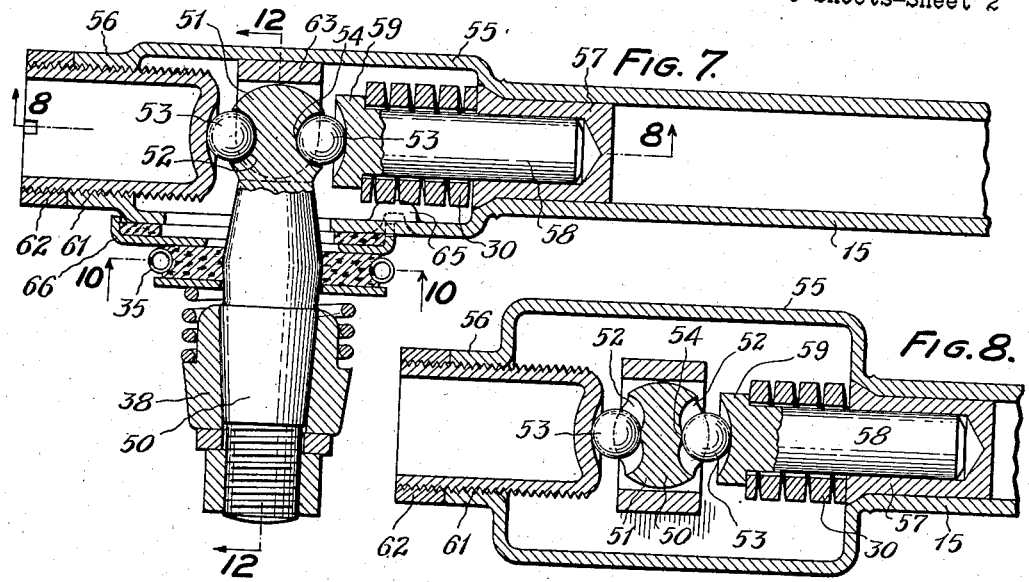
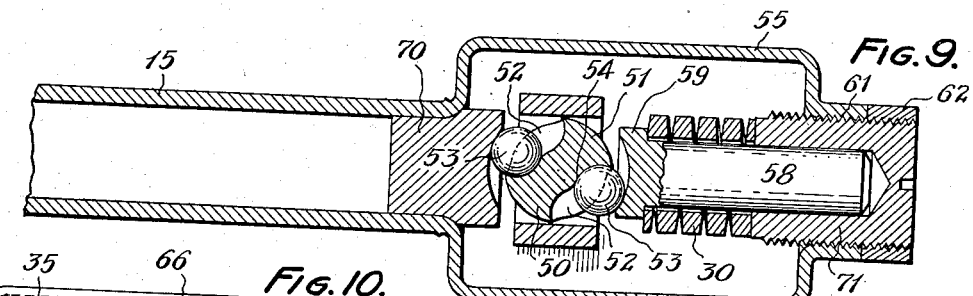
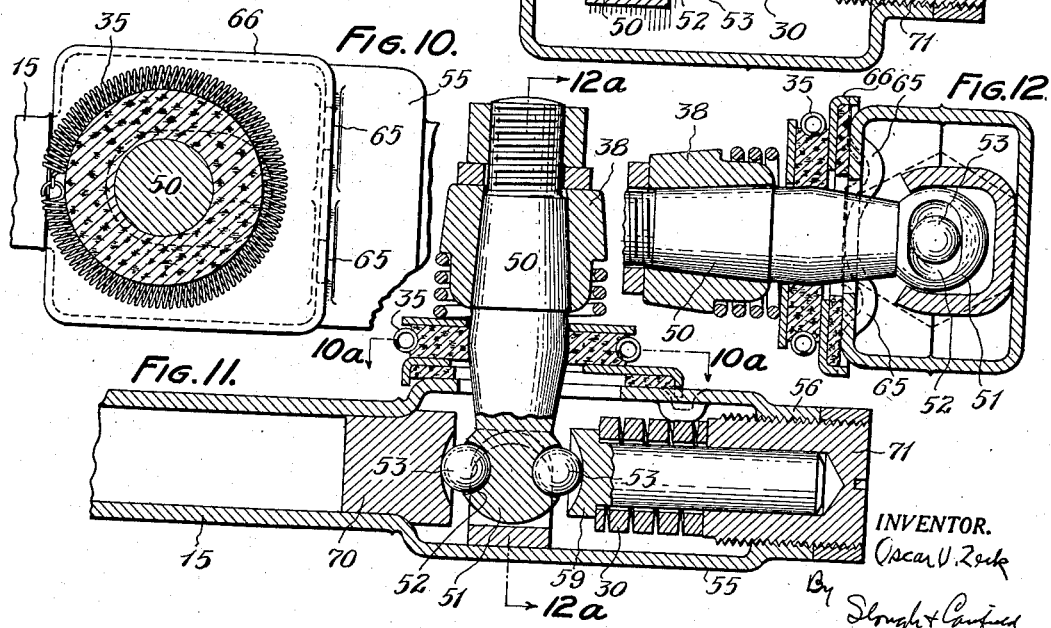
INVENTOR.
Oscar U. Zerk
By Slough & Canfield
ATTORNEYS Jan. 7, 1936. O. U. ZERK 2,027,138
UNIVERSAL JOINT
Filed April 12, 1932 3 Sheets-Sheet 3
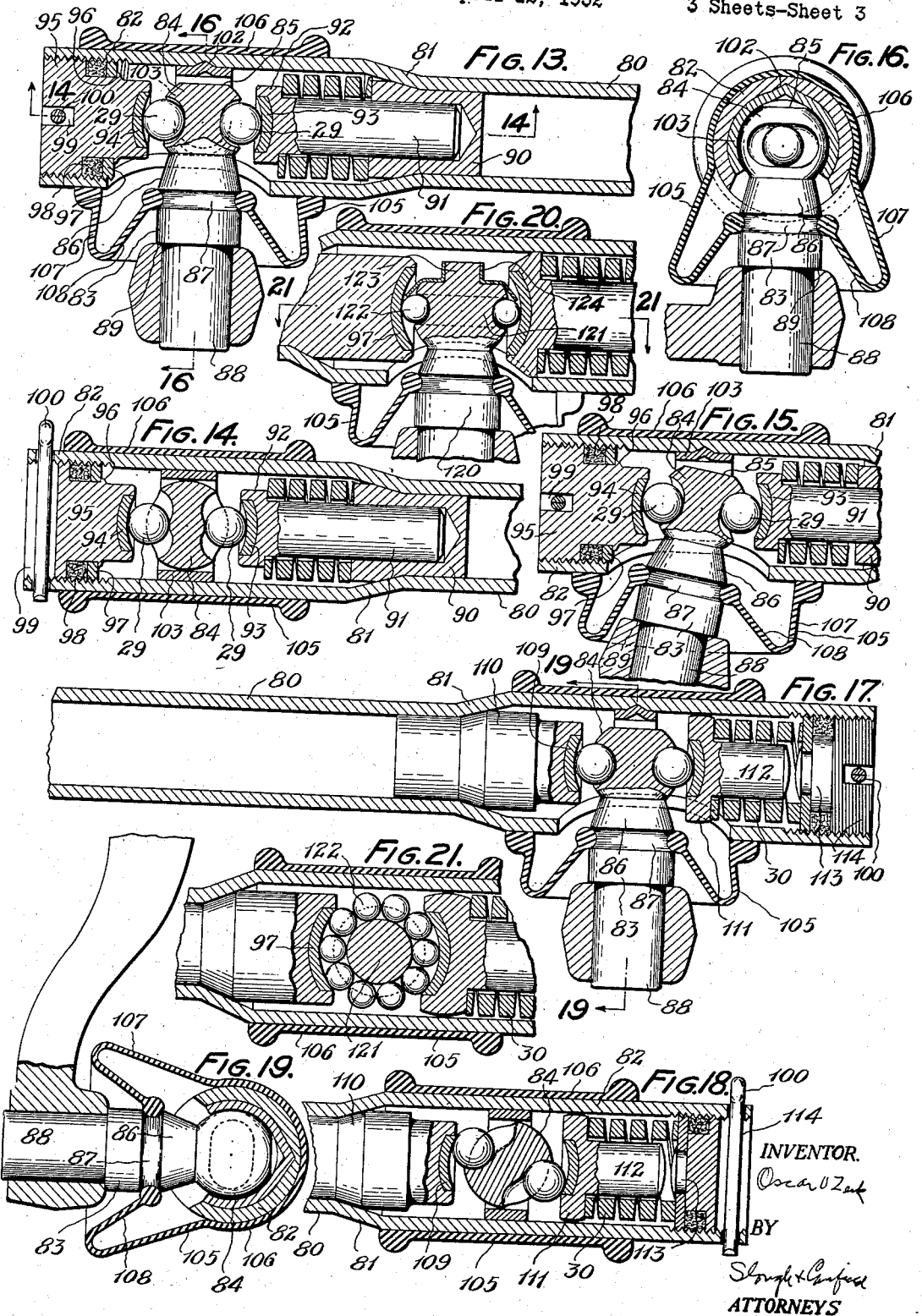
INVENTOR.
Oscar U Zerk
BY
Slough & Canfield
ATTORNEYS Patented Jan. 7, 1936

2,027,138

UNITED STATES PATENT OFFICE 2,027,138

UNIVERSAL JOINT

Oscar U. Zerk, Cleveland, Ohio

Application April 12, 1932, Serial No. 604,780

6 Claims. (Cl. 287—90)

My invention relates generally to universal joints and particularly to drag link or tie rod joints such as used in the steering mechanism of an automobile. Practically all makes of automobiles now employ a ball and socket type joint for the tie rod and drag link connection of the steering mechanism due to the fact that the levers and rods connected with these elements do not move in a plane and consequently will effect a universal movement of the joints. Furthermore, since it is essential in a steering mechanism to eliminate play or back-lash, a plurality of powerful springs, usually four in number, are used at each of the four ball joints pressing the ball sockets against a ball. These relatively powerful springs create considerable friction between the individual sockets, usually eight in number, and the balls, usually four, of the ball and socket joints, with the result that the steering of an automobile is becoming increasingly difficult, particularly when turning relatively sharp corners or when maneuvering the car from a parked position providing relatively little room.

The tension of the above mentioned spring depends upon the resistance of the wheels against the road surface when turning the wheel with the steering mechanism. These springs are usually sufficiently strong to prevent the ball from being moved away from its retaining socket when a relatively large steering effort is exerted. However, it has been found that if the springs are made sufficiently strong to overcome the extreme resistance encountered, the steering effort required would become very annoying and tiring to the driver. For this reason the springs are not made sufficiently strong to retain the balls within their respective sockets when extreme steering conditions are encountered, but the resultant friction between the ball and socket joint is still sufficiently great to cause a relatively large amount of steering effort to be exerted.

To reduce the friction therebetween, the chamber within which the ball and socket are disposed is packed with grease and the opening therein through which the male portion of the joint extends is encased with a metal or felt cover. The primary purpose of these covers is to prevent the ingress of dust to the joint, with the result that the grease or oil seeps from the chamber. These relatively large bearing surfaces moving under high pressure cause the relatively small amount of packing grease to soon become contaminated with rubbed-off metal particles. The loss of lubricant, together with the contamination of the grease and the rubbing of the surfaces due to the powerful oscillating action against the spring pressure usually results in increased steering effort after the car has been used for some time. This necessitates frequent renewal of the packing grease within the joint chamber.

It is a primary object of my invention, therefore, to provide a universal joint wherein relatively strong springs are employed with a minimum of friction between the joint elements and which will require little or no lubrication during the life of the automobile or the like on which it is used.

Another object of my invention is to provide an improved universal joint employing relatively small bearing surfaces.

Another object of my invention is to provide an improved universal joint requiring a minimum movement between the joint elements.

Another object of my invention is to provide an improved universal joint of the ball and socket type, wherein the ball element is the female bearing member and spring-pressed engaging elements comprise the male bearing element.

Another object of my invention is to provide an improved universal joint, the parts of which are susceptible of manufacture by relatively inexpensive stamping and screw machine operations.

Another object of my invention is to provide an improved universal joint, the bearing elements of which are effectively sealed against the ingress of foreign substances.

Another object of my invention is to provide an improved universal joint, which may be easily and efficiently assembled.

Another object of my invention is to provide an improved universal joint for tie rods, drag links, and like connections of a steering mechanism whereby a minimum of steering effort will be required.

Other objects of my invention and the invention itself will become more apparent to those skilled in the art to which my invention appertains, by consideration of the accompanying descriptions and drawings wherein:

Fig. 1 is a diagrammatic plan view, showing the general assembly of the steering mechanism of an automobile;

Fig. 2 is a longitudinal sectional view of a drag link embodying my invention connected thereby to a steering arm;

Fig. 3 is a plan view taken from the plane 3 of Fig. 2;

Fig. 4 is a horizontal sectional view taken axially of the drag link, showing the opposite end of the drag link from that illustrated in Figs. 2 and 3, or the steering post and connections;

Fig. 5 is a transverse vertical sectional view taken from the plane 5 of Fig. 2;

Fig. 6 is a view generally similar to Fig. 4, but with the bearing elements in different rotated positions;

Fig. 7 is a longitudinal sectional view of a steering arm and drag link connection similar to Fig. 2 but showing a modification of my invention;

Fig. 8 is a horizontal sectional view along lines 8—8 of Fig. 7;

Fig. 9 is a horizontal sectional view taken axially of the drag link at the opposite end from that illustrated in Figs. 7 and 8, or the end connecting with the steering post;

Fig. 10 is a section taken along the lines 10—10 of Fig. 7;

Fig. 11 is a vertical sectional view of the modification of my invention illustrated in Fig. 7 and taken at the opposite end thereof showing the joints between the drag link and the steering post;

Fig. 12 is a transverse sectional view taken along the lines 12—12 of Fig. 7 or 12A—12A of Fig. 11;

Fig. 13 is a vertical longitudinal sectional view taken at the front or steering arm end of a drag link showing another modification of my invention;

Fig. 14 is a horizontal sectional view taken along the lines 14—14 of Fig. 13;

Fig. 15 is a view illustrating the construction of Figs. 13 and 14 wherein the bearing elements have been relatively rotated to the position indicated;

Fig. 16 is a vertical transverse sectional view taken along the lines 16—16 of Fig. 13;

Fig. 17 is a horizontal medial sectional view taken at the rear end of the drag link illustrated in Figs. 13 to 16, or at the steering post end of the drag link;

Fig. 18 is a vertical medial sectional view of the rear end of the drag link illustrated in Fig. 17, after the bearing elements have been relatively rotated to an extreme position;

Fig. 19 is a transverse sectional view taken along the line 19—19 of Fig. 17;

Fig. 20 is a horizontal medial cross sectional view taken at the rear or steering post end of the drag link, illustrating another modification of my invention;

Fig. 21 is a vertical cross sectional view taken along the lines 21—21 of Fig. 20.

Referring to Fig. 1 of the drawings wherein I have shown the general assembly of the steering mechanism of an automobile, the steering knuckle, provided with an integral spindle upon which the wheel is mounted, is rotatively supported by an axle 1 and is provided with an inwardly extending integral steering arm 2. Due to the fact that the axis of rotation of the steering knuckle is slightly inclined to the vertical, the steering arm 2, will not move in a horizontal plane but will move vertically upwardly or downwardly in addition to radially as the wheel is turned and this vertical movement will be greatest at the inwardly extending end where it is connected to a drag link 3. A universal type joint must therefore be provided for connecting the steering arm 2 and the drag link 3.

The conventional method of actuating the drag link is to rotate a steering post 4 by means of a steering wheel 5, and through suitable transmission such as worm gearing to actuate a lever radially in a vertical plane. This lever is connected to the drag link to actuate it generally forwardly or backwardly to effect the turning movement of the wheel. The steering post end of the drag link must necessarily move both in a direction to accommodate the vertical radial movement of the aforesaid lever and in a direction to accommodate the generally horizontal movement of the opposite or steering arm end of the drag link. Thus a universal type joint must also be provided between the steering post lever and the drag link.

The steering knuckle is also provided with an integral rearwardly and inwardly extending arm 6 to which a tie rod generally indicated at 7 is connected. For the reasons hereinbefore described the end of arm 6 to which the tie rod 7 is connected will move both radially and vertically as the wheel is rotated and the tie rod will therefore move both vertically and laterally, necessitating a universal type joint between the tie rod 7 and the arms 6.

My invention is designed to provide an improved universal type joint for these and like connections.

Referring to Figs. 2, 3, 4, 5, and 6 wherein I show a preferred embodiment of my invention, a female bearing element generally indicated at 8 is adapted to engage a steering arm or a steering post lever. The bearing element 8 comprises a generally spherical head portion 9, preferably flatted at 10, integrally secured to a shank which progressively increases in diameter from the head 9 to a substantially cylindrical portion 10, then progressively decreases in diameter along a portion 11 to a reduced threaded end 12. The head 9 is provided with a raceway 13 which is elliptical shaped in cross section and progressively decreases until it reaches the axis of bearing element 8 whereupon it become circular in cross section, thus providing a semi-spherical bottom for the raceway, which is concentric with the generally spherical head 9.

A raceway 14 is provided diametrically opposite the raceway 13, the raceway 14 being semi-circular in cross section on vertical radial planes, and on horizontal plane being arced at the inner wall thereof concentric with the head 9 and flaring outwardly to the head surface at the ends thereof as is most clearly illustrated in Fig. 4.

The drag link preferably comprises a tubular arm 15 having similar generally box-shaped housings 16 integrally secured at each end thereof preferably by welding as indicated at 17. The housing 16 is provided with a frusto-conical shaped throat 18 at the inner end thereof and an internally threaded collar 19 at the opposite end. The housing which is preferably formed of sheet metal is pressed outwardly to form a seat 20 and in the top is depressed inwardly to form transverse recesses 21—21.

A conical shaped plug 22 provided with a semi-spherical tip 23 is tightly secured within an end of the tubular arm 15 of the drag link with an inwardly flaring shoulder thereon abutting the frusto-conical shaped throat of the housing 18. The cone element 22 is preferably secured by press fitting and is composed preferably of suitably hardened rustless or stainless chromium steel. The semi-spherical tip of the cone element 22 is disposed within the raceway 13 so as to be concentric with the semi-spherical portion of the raceway and also so that the center of the semi-spherical tip 23 will be co-axial with the bearing element 8. Sufficient clearance is provided between the cone portion of the bearing element 22 and the raceway 13 of head 9 to permit the head 9 to have a universal movement about the element 22, although the radial movement in a generally vertical plane is preferably less than that in a generally horizontal plane as will be readily seen by referring to Figs. 2 and 4.

A generally U-shaped saddle 24 is weldingly secured to the seat 20 of the housing and as illustrated in Fig. 5, is curved at the upper portion of the legs to conform to the contour of head 9 and thereby permit the head to have a universal movement about the center thereof while restricting lateral displacement of the head.

A threaded cap 25 having an inwardly reduced end 26 engages the collar 19 of the housing and is provided with a cylindrical recess within which is slidingly disposed a headed ball engaging member 27. Head 28 of member 27 is provided with a recessed portion having a circular wall and a partially spherical bottom, the spherical bottom being concentric with the head 9 of bearing element 8.

A ball 29 is disposed partially within the recess 14 of head 9 and is held in rolling engagement therewith by the partially spherical bottom of the recess provided in element 27. A spring 30 of relatively heavy construction encircles member 27, one end of which abuts the face of head 28 and the other end engages the inner face of cap 25.

The spring 30 is normally sufficiently compressed to hold the ball 29 within the raceway 14 of the head 9 even when an extreme pressure is exerted thereagainst when turning the wheel.

It will be observed that when the bearing element 8 is rotated relative to the drag link, it will be in rolling engagement at only two points in a plane generally at right angle to the axis of element 8 and it will rotate about the center of the head portion 9 of bearing element 8. By thus providing point to point contact and rolling engagement between the bearing elements the frictional forces are reduced to a minimum. By positioning the ball 29 centrally in the raceway 14 when the vehicle is moving in a straight line the ball will only have to roll half the distance of the entire turning range provided, thus necessitating a relatively small ball raceway 14 and maintaining sufficient strength and rigidity in the head 9.

To prevent the entry of foreign substances to the bearing chamber which might cause an abrasive action between the bearing elements, I provide an apertured, generally rectangular shaped packing element 31, the aperture therein being generally aligned with an oval shaped aperture 32 provided in housing 16 and through which the shank portion of bearing element 8 protrudes.

An inverted preferably sheet metal apertured cap 33 is disposed over the packing element 31 with the inner faces of the walls substantially engaging the sides of the housing 16 on three sides and the fourth side being disposed within the recesses 21 provided on the top of the housing, the face of the cap disposed within the recesses being notched generally centrally to accommodate the ridge intermediate the recesses 21. The cap 33 will thus be prevented from movement relative to the housing. A second packing element or ring 34 is superposed on the cap 33 and is tightly compressed against the portion 10 of bearing element 8 by a circular helical spring 35 which is more clearly illustrated in Fig. 10.

A preferably sheet metal annulus 36 is superposed on a packing ring 34 and is held in spring pressed relation thereagainst by a spring 37 the opposite end of which abuts a shoulder provided on a steering arm eye 38. The sealing elements 31 and 34 provide a dual means for preventing the ingress of foreign substances since pressure is exerted on packing ring 34 both in a radial and longitudinal direction.

The steering arm eye 38 is wedgingly secured to the surface 11 of bearing element 8 by a nut 39 which threadedly engages the end 12 thereof, and the intermediately placed washer 40. A lock nut 41 is also provided to engage the threaded cap 25 and abuts the outer face of collar 19 of housing 16 thus locking the cap in any adjusted position, and providing a means of regulating the compressive force exerted by the spring 30.

As illustrated in Figs. 4 and 5 the opposite or steering post end of the drag link is generally similar to the steering arm end with the exception that the positions of the conical bearing element and the balls are interchanged. A plug 43 is press-fitted against the shoulder 18 of the housing throat against which the spring 30 abuts. I preferably employ a hollow cone shaped bearing element 44 which threadedly engages the collar 19 of the housing and which is provided with spaced grooves at the outer end thereof, whereby the bearing element 44 may be rotated by a prong, wrench or the like.

Referring now to Figs. 7 to 19 inclusive, I show a modification of my invention wherein I employ two generally oppositely disposed balls rather than one ball and a generally conical shaped bearing contact element, the housing at the rear or steering post end of the drag link being generally similar to that illustrated in Figs. 2 to 6, and the front or steering arm of the drag link being provided with a generally cylindrical type housing.

In Figs. 7 to 12 inclusive, which will first be referred to as showing the connection between the drag link and the steering arm, a bearing element 50 disposed generally at right angles to the drag link is provided with a spherical fulcrum head 51 having therein diametrically disposed ball raceways 52. The ball raceways 52 are similar to the ball raceways previously described in connection with bearing element 8 and are adapted to have balls 53 roll therein along a curved surface 54 concentric with the head 51.

A generally box-shaped housing 55 is provided with a generally frusto-conical shaped throat portion to which a tubular arm 15 previously described, is weldingly secured, and at the outer end thereof provided with an interiorly threaded collar 56. A cylindrically recessed plug 57 is tightly secured within the end of tubular arm 15 and is held against longitudinal movement by an outwardly flaring shoulder abutting the housing throat.

A guide member 58 provided with a head 59 is slidingly disposed within the recess of plug 57. The recess provided in head 59 is partially spherical in form and when in normal position is concentric with the head 51 of bearing element 50, the recess therein is adapted to rollingly engage the ball 53 disposed in raceway 52. A normally compressed spring 30 previously described is interposed between the face of the head 59 and plug 57 to ensure that the ball 53 will always remain within the raceway 52.

A threaded tubular cap 61 engages the collar 56 of the housing and is provided with a recess in the head thereof similar to that described in connection with head 59 adapted to rollingly engage the oppositely disposed ball 52. A lock nut 62 is provided to ensure that the cap 61 will remain in any adjusted position.

A generally U-shaped saddle is weldingly secured to the interior of the housing and generally centrally thereof for a purpose previously described. A face of the housing is depressed inwardly at two spaced points 65 to form transversely extending generally semi-circular depressions therein adapted to engage projections formed on a preferably sheet metal cap 66 and thereby prevent relative movement between the cap 66 and the housing in a manner previously described. The manner of preventing the ingress of foreign substances to the bearing elements and the manner of securing the steering arm eye 38 to the bearing element 50 has been previously described in connection with the embodiment illustrated in Figs. 2 to 6.

Referring more particularly to Figs. 9 to 12 inclusive wherein I show the opposite end of the drag link which is connected to the steering post lever, the position of the spring pressed ball engaging element and the cap ball engaging element are relatively interchanged with the spring pressed element being disposed at the outer end of the housing. I therefore employ a plug 70 secured within the end of tubular element 15 and provided with a partially spherical ball engaging recess previously described. A solid cylindrically recessed cap element 71 threadedly engages the collar 62 to guide the element 57 and to seal the housing end. Otherwise the construction is similar to that described in connection with the opposite end of the drag link.

Referring now to Figs. 13, 14, 15 and 16, I show another modification of my invention as applied to the front end or steering arm end of the drag link. In this modification a tubular drag link 80 is flared outwardly as indicated at 81 to form a generally cylindrical bearing housing 82 in the ends thereof. The housing 82 is apertured as indicated at 83 to permit the shank of a female bearing element 83 to project therethrough. The female bearing element 83 comprises a generally spherical head 84 provided with oppositely disposed ball raceways 85 previously described in connection with the modification illustrated in Figs. 7 to 12, and preferably flatted as indicated at 85, and the portion 86 progressively increasing in diameter to a semi-cylindrical groove 87, thence to a cylindrical portion terminating in a reduced cylindrical end 88 and providing a shoulder 89 therebetween.

A cylindrical recessed plug 90 is disposed at the inner or throat end of the housing as previously described, and has slidingly positioned within the recess therein the shank 91 of an element provided with a recessed head 92. A hardened steel segment 93 is inserted in the said recess, the inner face of which is concentric with the spherical head 84 of the bearing element 83. A spring 30 presses the insert 93 against a ball 29 disposed in the raceway 85 of the head 84 in a manner previously described. A diametrically disposed ball is held in engagement in the opposite ball raceway provided in the head by a second insert 94 recessed in an inwardly extending shoulder 95 of a threaded plug 96 which threadedly engages the outer end of the housing. The shoulder 95 is provided with a circular ridge 96 which engages an externally threaded ring 97 and thereby secures a packing ring 98 intermediate the ring 97 and the inner face of plug 95.

The plug 95 is provided with a transverse slot 99 in the outer end thereof adapted to engage a pin 100 which is disposed in diametrically aligned apertures provided therefor in the end of the housing 82 to lock the plug in non-rotative relationship with the said housing. By rotating the plug 95 the packing ring 98 may be compressed to any desired point necessary to effectively seal the housing end.

A conical depression 102 is provided in the inner wall of the housing 82 axially of the bearing element 83 to accommodate a conical tip of a saddle which engages the head 84 of the female bearing element 83 to prevent lateral movement thereof relative to the housing 82. A sealing member generally indicated at 105 comprises the semi-cylindrical portion 106 disposed over the exterior of the housing and the flexible dual frusto-conical shaped portions 107 and 108, the portion 108 being provided with an integral generally cylindrical shape flexible ring 109 which constrictingly engages the bearing element 83 at the grooves 87 therein.

The sealing element 105 permits the bearing element 83 to be moved in a radial direction and still remain effectively sealed as is clearly illustrated in Fig. 15.

Referring to Fig. 17 wherein I show the modification of my universal joint illustrated in Figs. 13 to 16 but adapted to the rear or steering post end of the drag link, the construction is generally similar but the recessed ball engaging elements are relatively interchanged.

A plug 110 is secured within the arm 80 and against the frusto-conical shoulder 81 of the drag link and is provided with a reduced shoulder within which is recessed a hardened ball engaging insert 109. The oppositely disposed ball engages a similar insert recessed in a head 111 of an element, the shank 112 of which is encircled by the spring 30 which abuts the outer face of head 111 and at its opposite end seats against a threaded washer provided with a suitably hardened button insert 113. A packing ring 98 abuts the outer face of the said washer and is compressively held thereagainst by a threaded plug 114 which is locked in any adjusted position by a pin 100 in a manner previously described. The hardened button 113 acts as a stop against which the shank 112 abuts thus ensuring that the ball will always be retained within the raceway in bearing element 83.

Referring to Figs. 20 and 21 I have shown a modification of my invention generally similar to that described in Figs. 13 to 19 but wherein I employ a plurality of contacting relatively smaller balls encircling the female bearing element in a plane generally at right angles to the axis thereof. In this modification the female bearing element generally designated at 120 is provided with a semi-circular raceway 121 within which are disposed a plurality of contacting balls 122, and a cylindrical shoulder 123 having pressed thereon a preferably sheet metal ball retainer 124. The ball retainer 124 exerts sufficient inwardly directed pressure against the balls to ensure that they will be retained within the semi-circular raceway 121. The major portion of the thrust exerted against the balls due to the steering operation will be absorbed by the balls, in any relatively rotative position which are intermediate the hardened insert 109 and the bearing element 120 and relatively little against the remaining balls, so that the sheet metal cap will exert sufficient pressure thereagainst to restrain them from moving out of their normal position.

In the various modifications which I employ the spherical head of the female bearing element is constrained to move about the center thereof and means are provided to ensure that the ball elements will remain in the raceway provided therefor in the said spherical head. This is doubly ensured by means of the relatively strong normally compressed spring and the stop against which the relatively movable ball engaging element such as 91 in Fig. 13 will abut, the distance which the relatively movable ball engaging element can travel always being less than that necessary to displace the balls from their respective raceways.

The housing and the chambers within which the bearing elements are disposed are effectively sealed against the ingress of foreign substances. Means are provided to compensate for wear which may occur between the bearing elements since one of the ball engaging elements is always relatively movable and adapted to be locked in an adjusted position. Also the pressure exerted against the sealing element may be increased as required to ensure that an effective seal will always be maintained against the ingress of foreign substances.

Although I have shown various embodiments in my invention I contemplate that numerous and extensive departures may be made therefrom without departing from the spirit and scope of the invention and the appended claims. Having thus described the invention what I claim is:—

1. In a joint construction for drag links, tie rods and the like, a housing element adapted to be associated with a tie rod to oscillatably move longitudinally therewith, a bearing element projected into the housing element, and having a bearing portion thereon, a pair of ball raceway cavities on opposite sides of the bearing portion, the housing element being provided with a pair of spaced raceway cavities each concavely confronting a raceway cavity of the bearing element, balls in the pairs of confronting raceways thus provided, the balls and raceway cavities being substantially in co-alignment with the direction of oscillatory movement of the tie rod associated housing element, and means resiliently checking movement of the bearing element after a predetermined movement from a normal position.

2. In a joint construction for drag links, tie rods and the like, a housing element adapted to be associated with a tie rod to oscillatably move longitudinally therewith, a bearing element projected into the housing element, and having a bearing portion thereon, a pair of ball raceway cavities on opposite sides of the bearing portion, the housing element being provided with a pair of spaced raceway cavities each concavely confronting a raceway cavity of the bearing element, balls in the pairs of confronting raceways thus provided, the balls and raceway cavities being substantially in co-alignment with the direction of oscillatory movement of the tie rod associated housing element and means to resiliently compressibly retain the balls and raceways in engagement, said means being adapted to yieldingly check movement of the bearing element when the balls are in engagement with the extremities of the raceways.

3. In a joint construction for drag links, tie rods and the like, a housing element adapted to be associated with a tie rod to oscillatably move longitudinally therewith, a bearing element projected into the housing element, and having a bearing portion thereon, a pair of ball raceway cavities on the opposite sides of the bearing portion having portions concentric with the bearing element axis and having inclined end portions, the housing element being provided with a pair of spaced raceway cavities each concavely confronting a raceway cavity of the bearing element, balls in the pairs of confronting raceways thus provided, the balls and raceway cavities being substantially in co-alignment with the direction of oscillatory movement of the tie rod associated housing element and means to resiliently compressibly retain the balls and raceways in engagement, and means to prevent lateral shifting of the said bearing portion of the bearing element to maintain the said alignment relation of the said balls and raceways.

4. In a joint construction for drag links, tie rods and the like, a housing element adapted to rods and the like, a housing element adapted to be associated with the tie rods to oscillatably move longitudinally therewith, a bearing element projected into the housing element and the bearing having a bearing portion thereon, the bearing element having external spherical surface portions, means preventing lateral shifting of the bearing element comprising a concavely spherical bearing surface engaged therewith and provided in the housing element, a pair of ball raceway cavities on opposite sides of the bearing portion, the housing element being provided with a pair of spaced raceway cavities each concavely confronting a raceway cavity of the bearing element, balls in the pairs of confronting raceways thus provided, the balls and raceway cavities being substantially in co-alignment with the direction of oscillatory movement of the tie rods.

5. In a joint construction for drag links, tie rods and the like, a housing element adapted to rods and the like, a housing element adapted to be associated with the tie rods to oscillatably move longitudinally therewith, a bearing element projected into the housing element and having a bearing portion thereon, a pair of ball raceway cavities on opposite sides of the bearing portion, the housing element being provided with a pair of spaced raceway cavities each concavely confronting a raceway cavity of the bearing element, balls in the pair of confronting raceway element, balls in the pair of confronting raceways thus provided, the balls and raceway cavities being substantially in co-alignment with the direction of oscillatory movement of the tie rods, and the raceway cavities permitting limited movement of the balls axially of the bearing element.

6. In a joint construction for drag links, tie rods and the like, a housing element adapted to be associated with the tie rods to oscillatably move longitudinally therewith, the housing element being provided with a pair of spaced-apart spherical raceway cavities having a common center and co-aligned with the direction of longitudinal oscillation of the tie rods, a bearing element projected into the housing having a bearing portion between the cavities, raceway means in the bearing portion, balls in the raceway means cavities for transmitting longitudinal tie rod thrust between the bearing element and the housing, and means associated with the bearing element for maintaining the balls in the raceways laterally of the raceway cavities.

OSCAR U. ZERK.